US008723988B2

(12) United States Patent
Thörn

(10) Patent No.: US 8,723,988 B2
(45) Date of Patent: May 13, 2014

(54) USING A TOUCH SENSITIVE DISPLAY TO CONTROL MAGNIFICATION AND CAPTURE OF DIGITAL IMAGES BY AN ELECTRONIC DEVICE

(75) Inventor: Karl Ola Thörn, Malmö (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 321 days.

(21) Appl. No.: 12/505,000

(22) Filed: Jul. 17, 2009

(65) Prior Publication Data

US 2011/0013049 A1 Jan. 20, 2011

(51) Int. Cl.
*H04N 5/262* (2006.01)
(52) U.S. Cl.
USPC ................... 348/240.99; 348/333.12
(58) Field of Classification Search
USPC ............ 348/14.1, 207.99, 211.4, 231.2, 348/240.99–240.3, 333.01, 333.12, 335, 348/561; 345/173–178, 653; 715/702, 863; 396/55, 76; 358/1.6
See application file for complete search history.

(56) References Cited

U.S. PATENT DOCUMENTS

| | | | | | |
|---|---|---|---|---|---|
| 5,511,148 | A | * | 4/1996 | Wellner | 358/1.6 |
| 5,568,183 | A | * | 10/1996 | Cortjens et al. | 348/14.1 |
| 5,752,094 | A | * | 5/1998 | Tsutsumi et al. | 396/76 |
| 6,067,112 | A | * | 5/2000 | Wellner et al. | 348/211.4 |
| 2001/0013897 | A1 | * | 8/2001 | Kowno et al. | 348/240 |
| 2004/0090548 | A1 | | 5/2004 | Obrador | |
| 2005/0094019 | A1 | * | 5/2005 | Grosvenor et al. | 348/335 |
| 2005/0174443 | A1 | * | 8/2005 | Niimura et al. | 348/231.2 |
| 2006/0001650 | A1 | * | 1/2006 | Robbins et al. | 345/173 |
| 2006/0026521 | A1 | * | 2/2006 | Hotelling et al. | 715/702 |
| 2007/0200953 | A1 | * | 8/2007 | Liu et al. | 348/561 |
| 2007/0283296 | A1 | | 12/2007 | Nilsson | |

(Continued)

FOREIGN PATENT DOCUMENTS

| | | |
|---|---|---|
| CN | 101226452 A | 7/2008 |
| EP | 1 670 253 A1 | 6/2006 |

(Continued)

OTHER PUBLICATIONS

Anonymous: "iPod touch Benutzerhandbuch (with iPhone 2.1 Software): pp. 15-45 and 134" Internet Citation, Sep. 9, 2008, pp. 15-45, 134, XP002565893, Retrieved from Feb. 16, 2010 the Internet: URL:http://manuals.info.apple.com/de_DE/iPod_touch_2.1_Benutzerhandbuch.pdf.

(Continued)

*Primary Examiner* — Lin Ye
*Assistant Examiner* — Dennis Hogue
(74) *Attorney, Agent, or Firm* — Myers Bigel Sibley & Sajovec, PA

(57) ABSTRACT

An electronic device includes a touch sensitive display device, a camera device, and a processor that executes computer readable program code embodied in a computer readable storage medium. Some of the computer readable program code is configured to control magnification of a digital image from the camera device to generate a magnified digital image that is displayed on the display device in response to distance between at least two touch points detected relative to a surface of the display device. Some other computer readable program code is configured to initiate capture of the magnified digital image in response to cessation of detection of at least one of the two touch points.

16 Claims, 6 Drawing Sheets

(56) References Cited

U.S. PATENT DOCUMENTS

| | | | |
|---|---|---|---|
| 2008/0101782 A1* | 5/2008 | Huang | 396/55 |
| 2008/0165141 A1 | 7/2008 | Christie | |
| 2008/0165255 A1 | 7/2008 | Christie et al. | |
| 2008/0168403 A1* | 7/2008 | Westerman et al. | 715/863 |
| 2008/0309632 A1* | 12/2008 | Westerman et al. | 345/173 |
| 2009/0015703 A1 | 1/2009 | Kim et al. | |
| 2009/0256947 A1* | 10/2009 | Ciurea et al. | 348/333.12 |
| 2010/0020221 A1* | 1/2010 | Tupman et al. | 348/333.01 |
| 2010/0053219 A1* | 3/2010 | Kornmann | 345/653 |
| 2010/0299641 A1* | 11/2010 | Cundill | 715/863 |

FOREIGN PATENT DOCUMENTS

| | | |
|---|---|---|
| JP | 9-116792 A | 5/1997 |
| JP | 2001159730 | 6/2001 |
| JP | 2008-104069 A | 5/2008 |
| WO | WO 2008/155868 A1 | 12/2008 |

OTHER PUBLICATIONS

PCT International Search Report and Written Opinion, PCT International Application No. PCT/IB2010/050215, Apr. 7, 2010.

Wearable Computing Lab: The Fingermouse Project, http://www2.wearable.ethz.ch/fingermouse.o.html, 3 pages, 2002.

Hesseldahl, "Apple's Magic Touch Screen", downloaded from http://www.businessweek.com/print/technology/content/mar2007/tc20070314_109157.htm, Mar. 15, 2007, 2 pages.

International Preliminary Report on Patentability, PCT/IB2010/050215, Sep. 30, 2011.

European Office Action Corresponding to European Patent Application No. 10 703 683.2-1502, mailed May 6, 2013 (7 pages).

Chinese Office Action and Search Report Corresponding to Chinese Patent Application No. 201080031752.4; Date of Issuance: Dec. 12, 2013; Foreign Text, 11 Pages; English Translation Thereof, 15 Pages.

* cited by examiner

USING A TOUCH SENSITIVE DISPLAY TO CONTROL MAGNIFICATION AND CAPTURE OF DIGITAL IMAGES BY AN ELECTRONIC DEVICE

BACKGROUND

The present invention relates to electronic devices and, more particularly, to touch screen user interfaces for electronic devices and related methods and computer program products.

Many electronic devices, such as wireless communication terminals (e.g., cellular telephones), personal digital assistants (PDAs), palmtop computers, and the like, include monochrome and/or color display screens that may be used to display webpages, images and videos, among other things. Portable electronic devices may also include Internet browser software that is configured to access and display Internet content. Thus, these devices can have the ability to access a wide range of information content, including information content stored locally and/or information content accessible over a network such as the Internet.

As with conventional desktop and laptop computers, portable electronic devices have been provided with graphical user interfaces that allow users to manipulate programs and files using graphical objects, such as screen icons. Selection of graphical objects on a display screen of a portable electronic device can be cumbersome and difficult, however. Early devices with graphical user interfaces typically used directional keys and a selection key that allowed users to highlight and select a desired object. Such interfaces can be slow and cumbersome to use, as it may require several button presses to highlight and select a desired object.

More recent devices have employed touch sensitive screens that permit a user to select a desired object by pressing the location on the screen at which the object is displayed. However, such devices have certain drawbacks in practice. For example, while the spatial resolution of a touch screen can be relatively high, users typically want to interact with a touch screen by touching it with a fingertip. Thus, the size of a user's fingertip limits the actual available resolution of the touchscreen, which means that it can be difficult to manipulate small objects or icons on the screen, particularly for users with large hands. Furthermore, when using a touchscreen, the user's finger can undesirably block all or part of the display in the area being touched. System designers are faced with the task of designing interfaces that can be used by a large number of people, and thus may design interfaces with icons larger than necessary for most people. Better touch resolution can be obtained by using a stylus instead of a touch screen. However, users may not want to have to use a separate instrument, such as a stylus, to interact with their device.

SUMMARY

An electronic device according to some embodiments includes a touch sensitive display device, a camera device, and a processor that executes computer readable program code embodied in a computer readable storage medium. Some of the computer readable program code is configured to control magnification of a digital image from the camera device to generate a magnified digital image that is displayed on the display device in response to distance between at least two touch points detected relative to a surface of the display device. Some other computer readable program code is configured to initiate capture of the magnified digital image in response to cessation of detection of at least one of the two touch points.

The computer readable program code may be configured to initiate retrieval of the magnified digital image from a volatile memory and storage into a non-volatile memory in response to cessation of detection of at least one of the two touch points.

The computer readable program code may be configured to initiate storage of the magnified digital image into a non-volatile memory in response to cessation of detection of any touch points on the surface of the display device.

The computer readable program code may be configured to delay storage of the magnified digital image from the camera device into the non-volatile memory until expiration of a defined non-zero time delay after cessation of detection of any touch points on the surface of the display device to avoid blurring of the captured image due to residual movement of the camera device.

The computer readable program code may be configured to control a variable amount of optical zoom by the camera device in response to distance between the two detected touch points. The camera device may be controlled to dynamically vary its optical zoom in response to changing distances between the two detected touch points. The camera device may be controlled to provide increased optical zoom in response to decreased distance between the two touch points.

The computer readable program code may be configured to control magnification of the displayed digital image by enlarging a portion of the displayed digital image that is between the two detected touch points. A portion of the displayed digital image that is between the two detected touch points may be enlarged to fill the display device. The program code may respond to cessation of detection of at least one of the two touch points by initiating cropping of the digital image to retain only a portion of the digital image that is within a box defined by the two detected touch points occurring before cessation of detection of at least one of the two touch points.

The computer readable program code may be configured to control magnification of the digital image by controlling an aspect ratio of the displayed digital image in response to distances between the two detected touch points along a two dimensional coordinate grid that is defined relative to the surface of the display screen. The program code may respond to cessation of detection of at least one of the two touch points by initiating cropping of the digital image to generate a cropped digital image having the aspect ratio that is defined by the two detected touch points occurring before cessation of detection of at least one of the two touch points, and storage of the cropped digital image into a non-volatile memory. The program code may respond to cessation of detection of at least one of the two touch points by initiating replacement of an originally displayed digital image with a replacement digital image having the aspect ratio that is defined by the two detected touch points occurring before cessation of detection of at least one of the two touch points.

The computer readable program code may be configured to the display on the display device a box having a size that is defined in response to locations of the two detected touch points and that visually identifies what portion of the displayed digital image will be magnified for display. The program code may dynamically control the size of the displayed box to track changes in the distance between two touch points, and initiate magnification of the digital image in response to cessation of detection of at least one of the two touch points.

In some other embodiments, an electronic device includes a camera device, the display device, and a controller. The camera device generates a digital image of an external object. The display device displays the digital image and to detect locations of at least two touch points relative to a surface of the display screen. The controller controls magnification of the digital image that is displayed on the display device in response to distance between the detected touch points, and initiates capture of the magnified digital image in response to cessation of detection of at least one of the detected touch points.

The electronic device may include non-volatile memory. The controller can be configured to initiate storage of the digital image from the camera device into the non-volatile memory in response to cessation of detection of at least one touch point on the display device.

The controller may control magnification of the digital image by controlling an amount of optical zoom by the camera device in response to distance between the two detected touch points.

The controller may be configured to crop the digital image to retain only a portion of the digital image that is within a box defined by the two detected touch points occurring before cessation of detection of at least one of the two touch points.

The controller may be configured to control magnification of the digital image by controlling an aspect ratio of the displayed digital image in response to distances between the two detected touch points along a two dimensional coordinate grid that is defined relative to the surface of the display device.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 1:
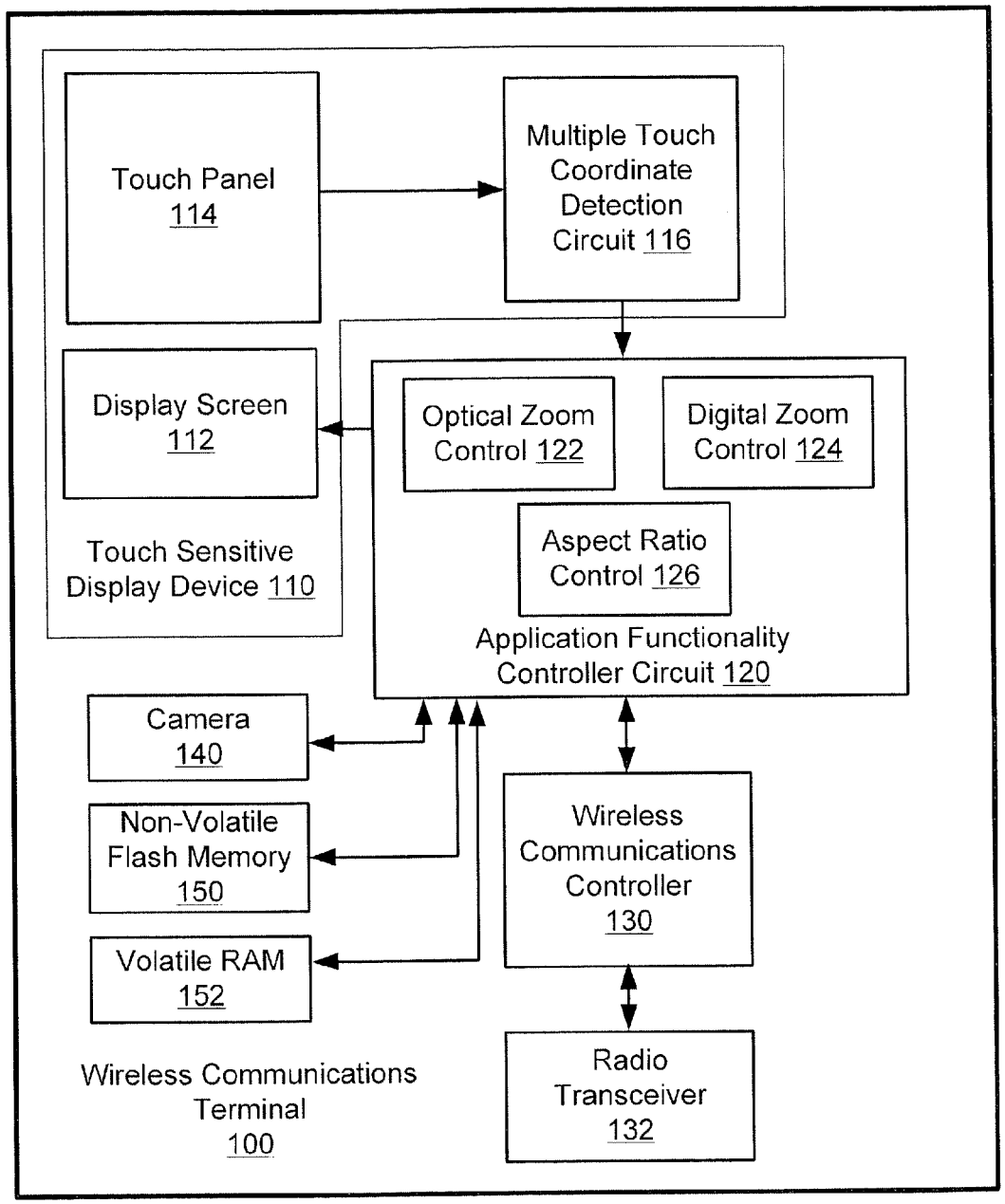
FIG. 1 is a block diagram of a mobile communication terminal that is configured to operate in accordance with some embodiments of the present invention.

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof. As used herein, the term "and/or" includes any and all combinations of one or more of the associated listed items. Furthermore, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this disclosure and the relevant art and will not be interpreted in an idealized or overly formal sense unless expressly so defined herein.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Furthermore, "coupled" or "connected" as used herein may include wirelessly coupled or connected.

The present invention may be embodied as methods, electronic devices, and/or computer program products. Accordingly, the present invention may be embodied in hardware (e.g. a controller circuit or instruction execution system) and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can electronically/magnetically/optically retain the program for use by or in connection with the instruction execution system, apparatus, controller or device.

Embodiments according to the present invention are described with reference to block diagrams and/or operational illustrations of methods and communication terminals. In this regard, each block may represent a module, segment, or portion of code, which comprises one or more executable instructions for implementing the specified logical function(s). It is to be understood that each block of the block diagrams and/or operational illustrations, and combinations of blocks in the block diagrams and/or operational illustrations, can be implemented by radio frequency, analog and/or digital hardware, and/or program instructions. These program instructions may be provided to a controller, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, or semiconductor system, apparatus, or device. More specific examples (a nonexhaustive list) of the computer-readable medium include the following: hard disk devices, optical storage devices, magnetic storage devices, portable computer diskettes, random access memory (RAM) devices, read-only memory (ROM) devices, erasable programmable read-only memory (EPROM or Flash memory) devices, and compact disc read-only memory (CD-ROM).

An electronic device can function as a communication terminal that is configured to receive/transmit communication signals via a wireline connection, such as via a public-switched telephone network (PSTN), digital subscriber line (DSL), digital cable, or another data connection/network, and/or via a wireless interface with, for example, a cellular network, a satellite network, a wireless local area network (WLAN), and/or another communication terminal.

An electronic device that is configured to communicate over a wireless interface can be referred to as a "wireless communication terminal" or a "wireless terminal." Examples of wireless terminals include, but are not limited to, a cellular telephone, personal data assistant (PDA), and/or a computer that is configured to communicate data over a wireless communication interface that can include a cellular telephone interface, a Bluetooth interface, a wireless local area network interface (e.g., 802.11), and/or another RF communication interface.

Some embodiments of the present invention may arise from the present realization that although some electronic devices are known to allow users to control magnification of digital images by moving fingers across a touch display, operation of these device causes the user's figures to obscure from view portions of the image that the user may want to see. For example, the IPHONE by Apple Inc allows a user to control picture size by touching the screen with two fingers and then pinching the fingers closer together or further apart to control magnification of a picture that is being displayed. The IPHONE is configured to react to detecting decreasing/increasing distance between the fingers irrespective of their starting position.

In accordance with some embodiments, an electronic device is configured to control the magnification and/or the aspect ratio of a digital image in response to where a user touches a touch screen at a plurality of locations. Thus, for example, a user can touch the screen using a thumb and index finger to indicate the corner locations that frame the portion of an image that is to be magnified and/or sized to provide a desired aspect ratio. A user may thereby significantly magnify a small portion of an image by framing that portion of the image with a closely spaced thumb and index finger at diagonal corners of the desired magnification frame. Similarly, the user may more slightly increase the magnification of a larger portion of the display by touching a larger portion of the display with the thumb and index finger spaced further apart at corresponding diagonal corners of the desired magnification frame.

In some embodiments, the electronic device initiates capture of the magnified image in response to determining that at least one of the two touch points has ceased to be detected. Thus, a user can touch the screen to frame the particular portion of the image that is to be captured, and the electronic device can initiate capture of the framed portion of the image in response to the user removing one or both fingers from the display. By waiting for the user to remove one or both fingers from the display before capturing the image, the electronic device may avoid taking the picture while the display is at least partially obstructed from view by the touching finger(s) and/or may avoid taking the picture while the electronic device is moving due to forces from the frame selecting fingers.

These and other embodiments of the present invention are described in further detailed below with regard to FIGS. 1-9.

FIG. 1 is a block diagram of a wireless communication terminal 100 that is configured to operate in accordance with some embodiments of the present invention. Although various embodiments are described in the context of the mobile communication terminal 100, the invention is not limited thereto as it may be embodied in any type of electronic device that includes a camera device and a touch sensitive display device. For example, the invention may be embodied in laptop computers or other devices that have touchpads where the user's touch locations can be input via the touchpads with corresponding indicia displayed on the screen.

Referring to FIG. 1, the terminal 100 includes a touch sensitive display device (display) 110, an application functionality controller circuit (functionality controller) 120, a wireless communications controller circuit (communications controller) 130, a radio transceiver 132, a camera device 140, nonvolatile memory 150 (e.g., flash memory), and volatile memory 152 (e.g., dynamic/static RAM). The term "controller" refers to digital circuitry, such as a general/special purpose processor that executes computer readable program code from a storage medium, and/or analog circuitry. The terminal 100 may include other devices, such as buttons, keypad, keyboard, speaker, microphone, etc.

The display 110 may be any suitable assembly that is configured to display graphical images and to detect user touch selections thereon and convert the detected touches into positional information that can be processed by the functionality controller 120. The display 110 may include a display screen 112, a touch sensitive panel 114, and a multiple touch coordinate detection circuit (coordinate detection circuit) 116. The display screen 112 may be a liquid crystal display (LCD) with or without auxiliary lighting (e.g., a lighting panel). In some cases the display screen 112 may be capable of displaying pictures and/or playing video content of a particular format (e.g., X and Y pixel count and/or aspect ratio).

Exemplary video formats that may be supported by the display screen 112 may include, without limitation, Quarter VGA (QVGA, 320×240 pixels), Common Intermediate Format (CIF, 360×288 pixels) and Quarter Common Intermediate Format (QCIF, 180×144 pixels).

The touch sensitive panel 114 may be configured as a resistive touchscreen panel, a capacitive touchscreen panel, a side-optical touchscreen panel, and/or another touch sensitive panel technology. A resistive touchscreen panel can include two spaced-apart thin metallic electrically conductive and resistive layers that connect to conduct electrical current at one or more locations where a user touches the display screen 112. This electrical current can be used by the coordinate detection circuit 116 to detect the coordinate locations of the one or more locations where the user is touching the display screen 112.

A capacitive touchscreen panel can be coated with a material, such as indium tin oxide, that conducts a continuous electrical current across a sensor to form a controlled field of stored electrons in both X and Y axes. When the capacitance field of the capacitive touchscreen panel is altered by another capacitance field, e.g., a user's finger, the coordinate detection circuit 116 can measure the distortion and identify X and Y axes location(s) of the disturbance.

A side-optical touchscreen panel can include a grid of optical detectors on top of the surface of the display screen 112. Light is sent from one side to the other and received by an array of detectors. The beams of light are broken when a finger or stylus is in close proximity such that the location can be translated into X and Y coordinates by the coordinate detection circuit 116.

Although various embodiments are described in the context of the sensing locations of where the user physically touches the display 112, the invention is not limited thereto. In some other embodiments, the terminal 100 can be configured to use a camera, infra-red (IR) light source and sensor(s), etc. to detect gestures by the user that are proximately located to the screen 112. For example, the display 112 may include an array of IR light sources and sensors arranged between various pixel locations on the display surface that can sense the x-y locations of fingers that are adjacent to, but not touching, the display 112. Accordingly, as used herein, the term "touch points" refers to locations on the screen where fingers or other user controlled objects are physically touching and/or adjacent to the display 112.

The camera device 140 includes an imaging circuit, such as a CCD (charge-coupled device), CMOS (complementary MOS) or other type of image sensor, and can be configured to record still images and/or moving images as digital images that are suitable for display and/or manipulation.

The wireless communications controller 130 is configured to communicate data over the radio transceiver 132 according to one or more communication protocols, such as one or more cellular communication protocols and/or other communication protocols. The cellular communication protocols may include, but are not limited to, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS). The other communication protocols may include, but are not limited to, Bluetooth, RFID, and/or WLAN (e.g., 802.11a, 802.11b, 802.11e, 802.11g, and/or 802.11i).

It is to be understood that the present invention is not limited to the particular configuration shown in FIG. 1, but is intended to encompass any configuration capable of carrying out operations described herein. While particular functionalities are shown in particular blocks by way of illustration, functionalities of different blocks and/or portions thereof may be combined, divided, and/or eliminated. Moreover, the functionality of the hardware/software architecture of FIG. 1 may be implemented as a single processor system or a multi-processor system in accordance with various embodiments of the present invention.

FIGS. 2-6 illustrate exemplary digital images from the camera 140 that are displayed on the display screen 112 and illustrate operations that may be carried out by the functionality controller 120 to allow a user to control the optical and/or digital magnification of the digital images by touching the display 110.

Figure 4:
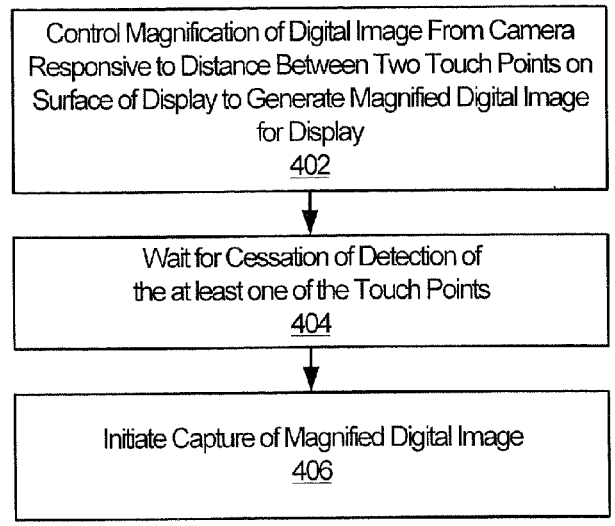

FIG. 4 illustrates general operations that may be carried out functionality controller 120 to control the magnification and capture of digital images. Referring to FIGS. 1 and 4, a user can touch the display 110 using two fingers to indicate the corner locations that frame a portion of a displayed image that is to be enlarged by optically zooming the camera 140 and/or digitally zooming the digital image (e.g., by cropping the digital image). The functionality controller 120 controls (Block 402) magnification of a digital image from the camera 140 in response to the distance between the touch points on the surface of the touch panel 114 to generate a magnified digital image which is displayed on the display screen 112.

The functionality controller 126 may display a box 200 that visually identifies what portion of the display digital image will be magnified for display. The user can control the size of the magnification box 200 by controlling the distance between the touch points. Accordingly, the user may increase the size of the magnification box 200 by increasing the distance between the fingers touching the display 110 and, correspondingly, may decrease the size of the magnification box 200 by decreasing the distance between the fingers.

In response to the user removing at least one or all of the fingers touching the display 110, the functionality controller 120 may respond (determination Block 404) by initiating capture of the magnified digital image (Block 406). The functionality controller 120 may replace the displayed image with the captured magnified image, such as shown by the magnified image in FIG. 3. The functionality controller 120 may refrain from interpreting touch points that do not define at least a threshold diameter magnification box 200 as being a magnification command. Alternatively or additionally, the functionality controller 120 may wait for three touch points to be detected that define three corner locations for the magnification box 200 (e.g., define three of the four corners of the box), while again refraining from interpreting touch points that do not define at least a threshold diameter magnification box 200 as being a magnification command.

Figure 2:
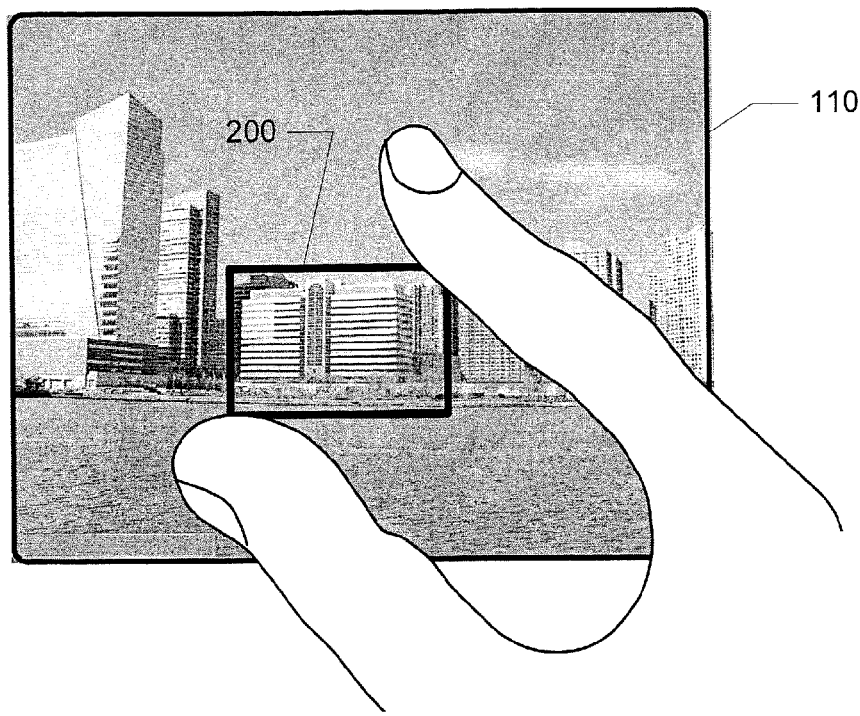
FIGS. 2-6 illustrate exemplary digital images from a camera that are displayed on a touch screen device and illustrate associated operations carried out by the touch screen device to allow a user to control the optical and/or digital magnification of the digital images by touching the touch screen device according to some embodiments of the present invention.

Although FIG. 2 illustrates that magnification of the image is controlled in response to locations of two fingers that are touching the display 110, the functionality controller 126 may alternatively or additionally be configured to control magnification in response to a sequence of separate touch locations on the display 110 (e.g., a user touching two or more locations using one finger) and/or in response to more than two simultaneous touch locations on the display 110 (e.g., three or four fingers) framing the portion of the image that is to be magnified.

Figure 5:
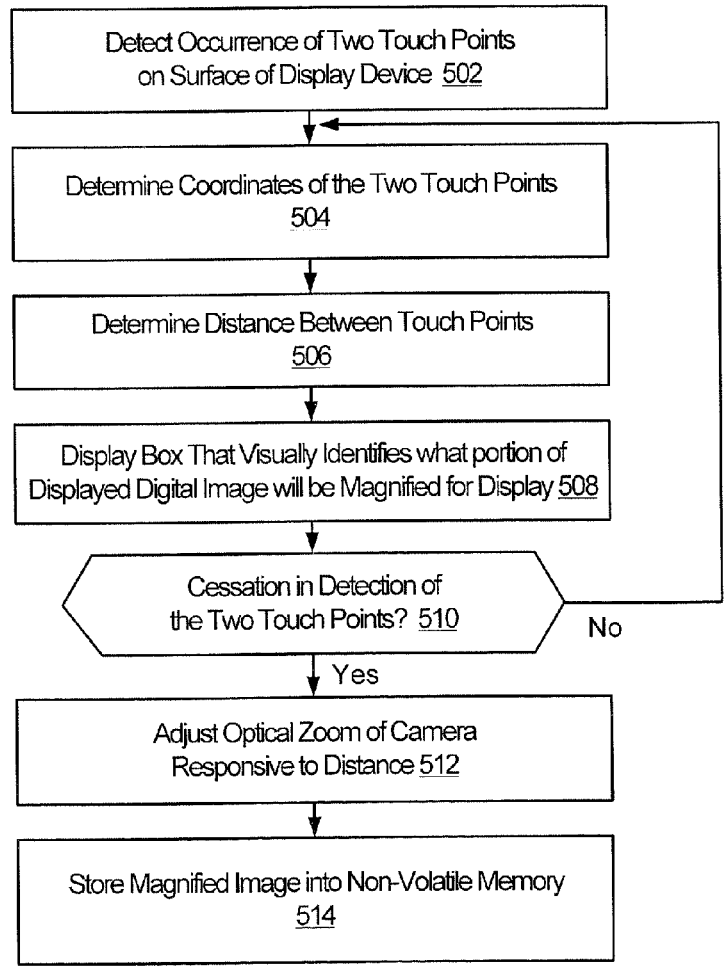

FIG. 5 illustrates more particular exemplary operations that may be carried out by an optical zoom control module 122 of the functionality controller 120 to control optical magnification and timing of the capture of digital images. Referring to FIGS. 1-3 and 5, the touch panel 114 detects (Block 502) occurrence of at least two touch points relative to a surface of the touch panel 114 that is displaying an image from the camera device 140. The displayed image may temporarily reside in a volatile RAM 152 (e.g., temporarily buffered in the RAM 152 before permanent capture). The detected touch points may occur simultaneously (e.g. by a user simultaneously touching the panel 114 using two or more fingers) or may be a sequence of non-time overlapping touch events (e.g. by a user sequentially touching the panel 114 at two or more locations using the same finger). The coordinate detection circuit 116 determines (Block 504) X and Y coordinates of the two touch points and determines (Block 506) the distance between the touch points. The optical zoom control module 122 regulates an optical zoom mechanism of the camera 140 to adjust magnification of the image in response to the distance between the touch points.

Figure 3:
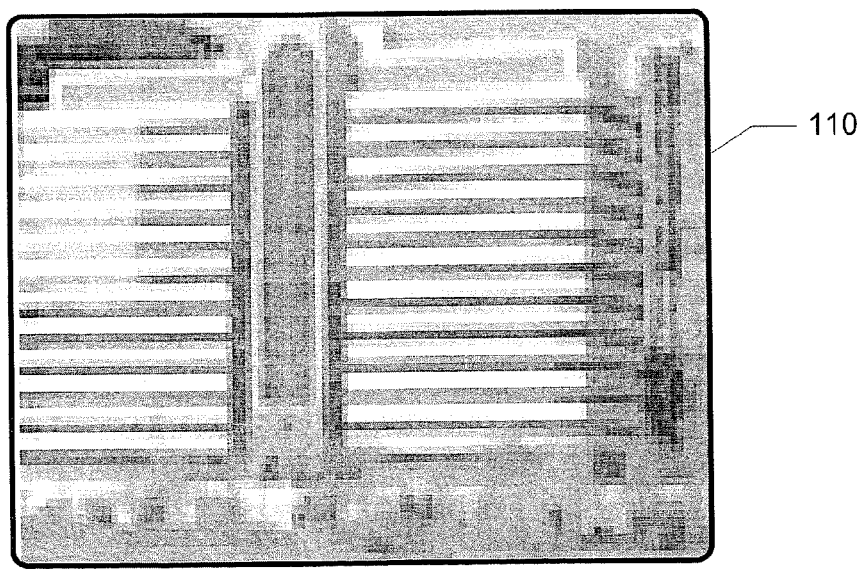

The optical zoom control module 122 may allow a user to adjust the size of the magnification box 200 by increasing/decreasing the distance between the fingers touching the touch panel 114 until it is determined (Block 510) that at least one of the two touch points has ceased to be detected. The optical zoom control module 122 may then respond thereto by adjusting (Block 512) the optical zoom of the camera 140 to provide a defined magnification that corresponds to the distance between the touch points so that the resulting image fills the display screen 112 (e.g., as shown in FIG. 3). The magnified image is more permanently captured by storing (Block 514) it in the non-volatile memory 150.

As explained above, by waiting for the user to remove one or both fingers from the display before capturing the image, the optical zoom control module 122 may avoid taking the picture while the display screen 112 is at least partially obstructed from view by the touching fingers and/or may avoid taking the picture while the camera 140 is moving due to forces from the frame selecting fingers. In some further embodiments, the optical zoom control unit 122 may further wait to capture the image until after expiration of a defined non-zero time delay following cessation of detection of any touch points on the touch panel 114, so as to allow the user a brief moment to position a desired object within field of view of the zoomed image and/or to dampen any residual movement of the camera 140 following removal of one or more fingers therefrom.

The camera 140 may provide very fast optical zoom to a precise level that has been specified by a user because the optical zoom control unit 122 can calculate a zoom value in response to the distance between the touch points and can then command the camera 140 to optically zoom in response to the calculated zoom value without waiting for further input from the user. The speed and accuracy of this camera control is in sharp contrast to what may be obtained if the optical zoom of the camera 140 were instead controlled through a repetitive process of detecting a direction of movement of the user's fingers (e.g., pinching together), controlling the camera 140 to zoom a fixed incremental step, displaying a newly zoomed image to the user, and waiting for the user to respond with a continued finger movement (e.g., further pinching together), and incrementally repeating this process until the newly zoomed image displayed to the user is deemed satisfactory and/or the user's fingers undesirably obscure the displayed image from the user's view.

Because the operations of FIG. 5 calculate the zoom value in response to the distance between the touch points, the optical zoom of the camera may be controlled with a more continuous range of available zoom levels, instead of fixed incremental step values which would otherwise be used if the camera's zoom were controlled through incremental steps responding to continued movement of the user's fingers on a display.

In some other embodiments, the optical zoom control unit 122 may control the camera 140 to dynamically vary its optical zoom in response to changing distances between the two detected touch points. Accordingly, Block 512 shown in FIG. 5 may occur before the decision at Block 510. A user may thereby view an image from the camera 140 and cause the camera 140 to zoom so as to enlarge a portion of the image that is framed between two or more locations on the displayed image where the user touches the touch panel 114. The user may define a first optical zoom amount by defining the magnification box 200 between two fingers that are offset to define two diagonal corners of the magnification box 200 and/or may sequentially touch two or more locations that define corners of the magnification box 200, and may then refine the user by changing the size of the magnification box 200

Figure 6:
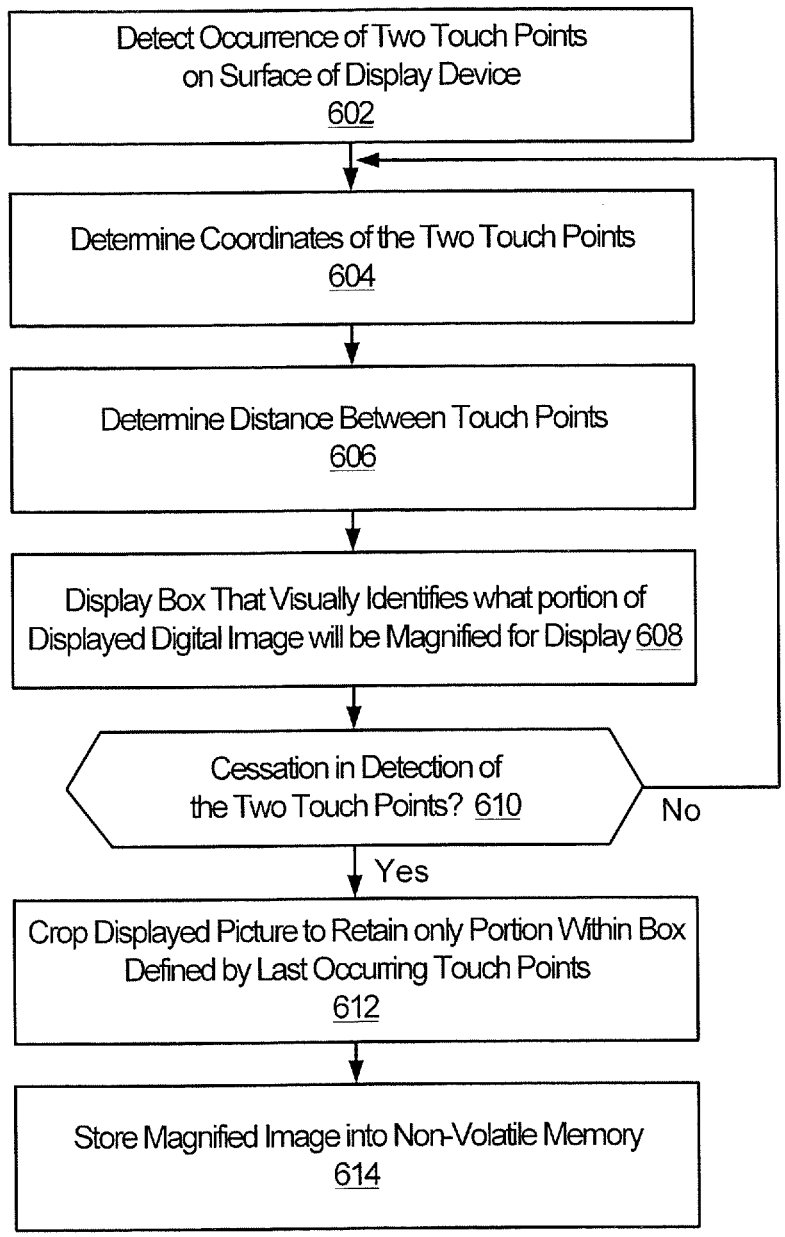

FIG. 6 illustrates particular exemplary operations that may be carried out by a digital zoom control module 124 of the functionality controller 120 to control digital magnification of the camera image and capture thereof. The operations 602 to 610 may be the same as the corresponding operations 502 to 510 described above regarding FIG. 5. In contrast to the operations of Block 512 of FIG. 5 that control optical zooming of the camera 140, the digital zoom control module 124 regulates digital magnification of a portion of a digital image from the camera 140. At Block 612, the control module 124 digitally magnifies a portion of the displayed digital image that is within the magnification box 200 between the two detected touch points. The digital image, which may be temporarily stored in the volatile memory 152, may be cropped to retain only a portion of the digital image that is framed within the magnification box 200. Accordingly, in response to detecting that at least one of the two touch points has been removed, the framed portion of the digital image is digitally enlarged to fill the display screen 112 (e.g., such as shown in FIG. 3). At Block 613, the digitally magnified image is stored in the non-volatile memory 150.

In some embodiments, the digital zoom control unit 124 may display a continuously updated image of what the camera 140 is viewing and initiating cropping of the viewed image after expiration of a defined non-zero time delay following cessation of detection of any touch points on the touch panel 114. The time delay may allow the user a brief moment to position a desired object within the magnification box 200 that is to be digitally magnified and/or to dampen any residual movement of the camera 140 following removal of one or more fingers therefrom.

Figure 7:
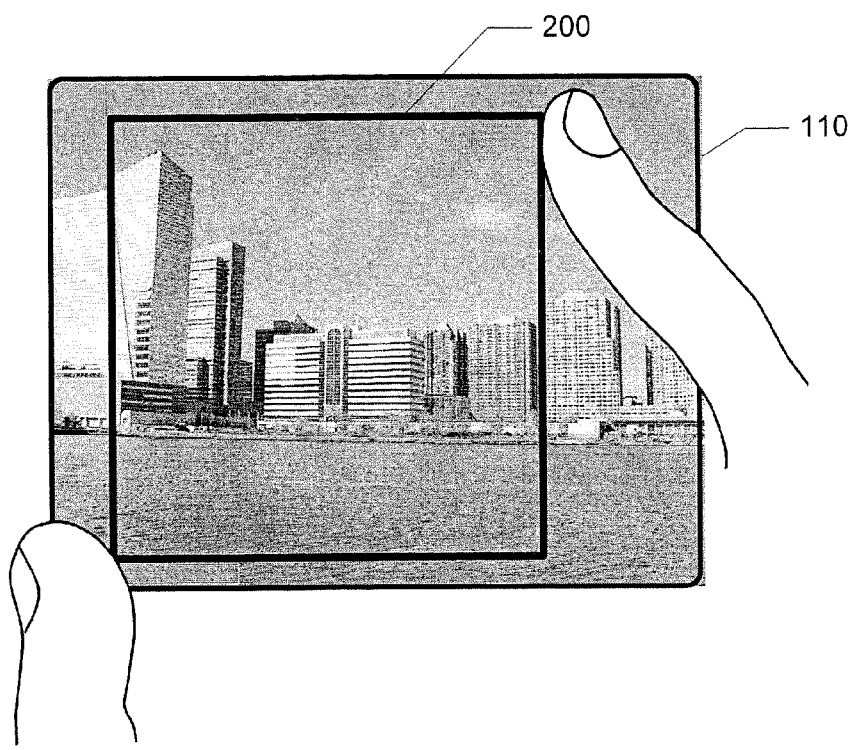
FIGS. 7-9 illustrate exemplary digital images from a camera that are displayed on a touch screen device and illustrate associated operations carried out by the touch screen device to allow a user to control the aspect ratio of the digital images by touching the touch screen device according to some embodiments of the present invention.
Figure 8:
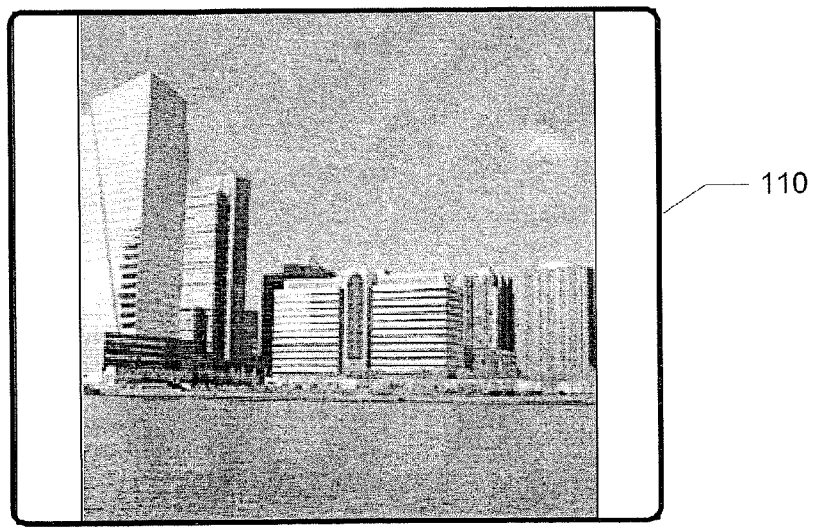
Figure 9:
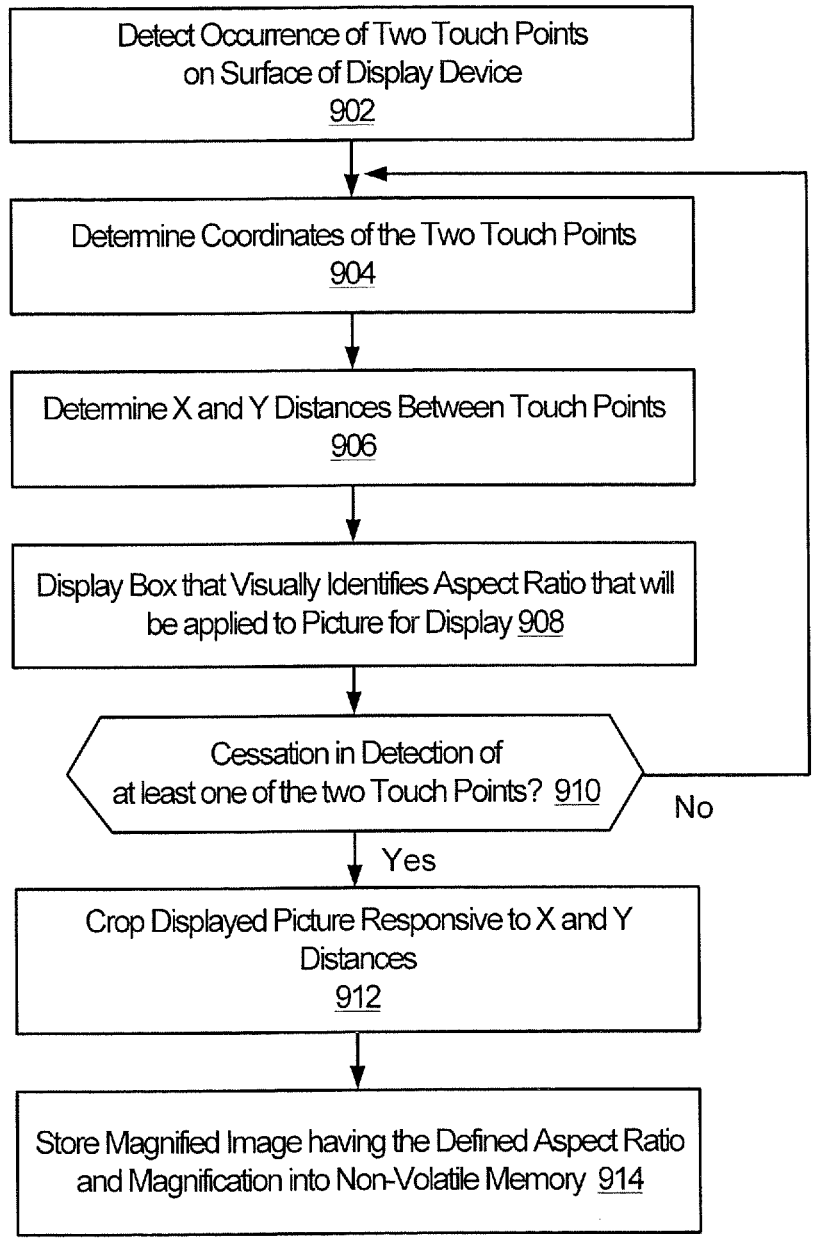

FIGS. 7-9 illustrate exemplary digital images from the camera 140 that are displayed on the display 110 and illustrate associated operations carried out by the functionality controller 120 to allow a user to control the aspect ratio of digital images from the camera by touching the display 110. Referring to FIGS. 7 and 8, a user can touch two or more locations on the display 110 to define an aspect ratio for an image that is to be captured. The image may then be cropped to provide the defined aspect ratio and stored in the non-volatile memory 150. For example, the image that is shown inside the box 200 of FIG. 7 has been cropped to fill the display 110 shown in FIG. 8.

FIG. 9 illustrates particular exemplary operations that may be carried out by an aspect ratio control module 126 of the functionality controller 120 to control the aspect ratio of a image that is captured by the camera 140. The occurrence of two or more touch points on a surface of the touch panel 114 are detected (Block 902). The coordinate detection circuit 116 determines the coordinates of the touch points (Block 904), and further determines the two-dimensional X and Y distances between the touch points (Block 906). The aspect ratio control module 126 displays (Block 908) the box 200 that visually identifies the aspect ratio though be applied to resize the picture image from the camera 140.

The aspect ratio control module 126 may allow a user to adjust the size of the magnification box 200 by increasing/decreasing the distance between the fingers touching the touch panel 114 until it is determined (Block 910) that at least one of the two touch points has ceased to be detected. The aspect ratio control module 126 may then respond thereto by cropping (Block 912) the digital image from the camera 140 to provide the aspect ratio that corresponds to the distance between the touch points, which may be displayed on the display screen 112 (e.g., as shown in FIG. 8). The resized image is more permanently captured by storing (Block 914) it in the non-volatile memory 150.

In some embodiments, the aspect ratio control module 126 may display a continuously updated image of what the camera 140 is viewing and initiating cropping of the viewed image after expiration of a defined non-zero time delay following cessation of detection of any touch points on the touch panel 114. The time delay may allow the user a brief moment to position a desired object within the magnification box 200 (e.g., as shown in FIG. 7) that is to be digitally magnified and/or to dampen any residual movement of the camera 140 following removal of one or more fingers therefrom.

In some embodiments, the display screen 112 may include a pressure sensitive transducer. One or more of the control modules 122, 124, and/or 126 may then be configured to calculate the zoom box 200 in response to detecting the locations of two or more touch points on the display screen 112, and to initiate zooming and capture of a picture from the camera 140 (e.g., into the nonvolatile memory 150) in response to the pressure sensitive transducer sensing that the user is pressing harder than the initial touch points selections with one or more of the fingers.

Many different applications/variations will be apparent to a skilled person having knowledge of the present disclosure. In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A computer program product for operating an electronic device including a camera device and a touch sensitive display device, the computer program product comprising:
a non-transitory computer readable storage medium having computer readable program code embodied in the medium and comprising:
computer readable program code that is configured to control magnification of a digital image from the camera device by controlling an amount of optical zoom by the camera device to generate a magnified digital image that is displayed on the display device in response to a distance only between starting positions of at least two touch points detected relative to a surface of the display device, wherein the starting positions of the at least two detected touch points indicate corner locations that frame a portion of the digital image that is to be magnified;
computer readable program code that is configured to refrain from interpreting a plurality of touch points that do not define at least a threshold diameter as being a magnification command; and
computer readable program code that is configured to initiate capture of the magnified digital image in response to cessation of detection of at least one of the two touch points.

2. The computer program product of claim 1, further comprising computer readable program code that is configured to initiate retrieval of the magnified digital image from a volatile memory and storage into a non-volatile memory in response to cessation of detection of at least one of the two touch points.

3. The computer program product of claim 1, further comprising computer readable program code that is configured to initiate storage of the magnified digital image into a non-volatile memory in response to cessation of detection of any touch points on the surface of the display device.

4. The computer program product of claim 3, further comprising computer readable program code that is configured to delay storage of the magnified digital image from the camera device into the non-volatile memory until expiration of a defined non-zero time delay after cessation of detection of any touch points on the surface of the display device to avoid blurring of the captured image due to residual movement of the camera device.

5. The computer program product of claim 1, further comprising computer readable program code that is configured to control a variable amount of the optical zoom by the camera device in response to the distance between the two detected touch points.

6. The computer program product of claim 1, further comprising computer readable program code that is configured to control magnification of the displayed digital image by enlarging only the portion of the displayed digital image that is framed between the two detected touch points.

7. The computer program product of claim 6 further comprising computer readable program code that is configured to enlarge the portion of the displayed digital image that is between the two detected touch points to fill the display device.

8. The computer program product of claim 7, further comprising computer readable program code that is configured to respond to cessation of detection of at least one of the two touch points by initiating cropping of the digital image to retain only a portion of the digital image that is within a box defined by the two detected touch points occurring before cessation of detection of at least one of the two touch points.

9. The computer program product of claim 1, further comprising computer readable program code that is configured to control magnification of the digital image by controlling an aspect ratio of the displayed digital image in response to the distance between the two detected touch points along a two dimensional coordinate grid that is defined relative to a surface of a display screen.

10. The computer program product of claim 9, further comprising computer readable program code that is configured to respond to cessation of detection of at least one of the two touch points by initiating cropping of the digital image to generate a cropped digital image having the aspect ratio that is defined by the two detected touch points occurring before cessation of detection of at least one of the two touch points, and storage of the cropped digital image into a non-volatile memory.

11. The computer program product of claim 9, further comprising computer readable program code that is configured to respond to cessation of detection of at least one of the two touch points by initiating replacement of an originally displayed digital image with a replacement digital image having the aspect ratio that is defined by the two detected touch points occurring before cessation of detection of at least one of the two touch points.

12. The computer program product of claim 1, further comprising computer readable program code that is configured to display on the display device a box having a size that is defined in response to locations of the two detected touch points and that visually identifies what portion of the displayed digital image will be magnified for display.

13. An electronic device comprising:
a camera device that generates a digital image of an external object;
a display device that is configured to display the digital image and to detect locations of at least two touch points relative to a surface of a display screen; and
a controller that is configured to control magnification of the digital image that is displayed on the display device by controlling an amount of optical zoom by the camera device in response to a distance only between starting positions of the detected touch points, to refrain from interpreting a plurality of touch points that do not define at least a threshold diameter as being a magnification command, and to initiate capture of the magnified digital image in response to cessation of detection of at least one of the detected touch points, wherein the starting positions of the detected touch points indicate corner locations that frame a portion of the digital image that is to be magnified.

14. The electronic device of claim 13, further comprising:
a non-volatile memory,
wherein the controller is further configured to initiate storage of the digital image from the camera device into the non-volatile memory in response to cessation of detection of at least one touch point on the display device.

15. The electronic device of claim 13, wherein:
the controller is further configured to crop the digital image to retain only the portion of the digital image that is within a box defined by the two detected touch points occurring before cessation of detection of at least one of the two touch points.

16. The electronic device of claim 13, wherein:
the controller is further configured to control magnification of the digital image by controlling an aspect ratio of the displayed digital image in response to the distance between the two detected touch points along a two dimensional coordinate grid that is defined relative to the surface of the display device.

* * * * *